(12) United States Patent
Song et al.

(10) Patent No.: US 6,736,780 B2
(45) Date of Patent: May 18, 2004

(54) SYNTHETIC APERTURE FOCUSING METHOD FOR ULTRASOUND IMAGING BASED ON PLANAR WAVES

(75) Inventors: Tai Kyong Song, Seoul (KR); Jin Ho Chang, Bucheon-si (KR)

(73) Assignee: Medison Co., Ltd., Kangwon-do (KR)

( * ) Notice: Subject to any disclaimer, the term of this patent is extended or adjusted under 35 U.S.C. 154(b) by 66 days.

(21) Appl. No.: 10/180,614

(22) Filed: Jun. 25, 2002

(65) Prior Publication Data

US 2003/0125628 A1 Jul. 3, 2003

(30) Foreign Application Priority Data

Dec. 31, 2001 (KR) .......................... 2001-88787

(51) Int. Cl.[7] ................................ A61B 8/00
(52) U.S. Cl. ...................................... 600/447
(58) Field of Search ............... 600/447, 463, 600/437, 443, 449, 444; 128/916

(56) References Cited

U.S. PATENT DOCUMENTS 5,186,177 A * 2/1993 O'Donnell et al. ......... 600/463
5,465,722 A * 11/1995 Fort et al. .................. 600/447
5,951,479 A * 9/1999 Holm et al. ................ 600/447

FOREIGN PATENT DOCUMENTS

KR 2001-0051946 6/2001

OTHER PUBLICATIONS

METMBS'01—"Proceedings of the International Conference on Mathematics and Engineering Techniques in Medicine and Biological Sciences" by F. Valafar; Las Vegas, Nevada, USA Jun. 25, 28, 2001 CSREA Press.*
Korean Office Action, application number 2003–032629012, date of mailing Aug. 26, 2003.

* cited by examiner

Primary Examiner—George Manuel
Assistant Examiner—Ruby Jain
(74) Attorney, Agent, or Firm—Thelen Reid & Priest LLP; David B. Ritchie

(57) ABSTRACT

Planar waves are transmitted to a target object with an angle of wave propagation corresponding to a center position of a receive subaperture. The echo signals reflected from the target object are received by the receive subaperture, stored in a receive pattern memory and dynamic-focused. The dynamic-focused signals are then combined to form at least one beam pattern to produce an ultrasound image.

6 Claims, 13 Drawing Sheets

SYNTHETIC APERTURE FOCUSING METHOD FOR ULTRASOUND IMAGING BASED ON PLANAR WAVES

FIELD OF THE INVENTION

The present invention relates to ultrasound imaging, and more particularly, to a synthetic aperture focusing method for ultrasound imaging based on planar waves.

BACKGROUND OF THE INVENTION

Figure 1:
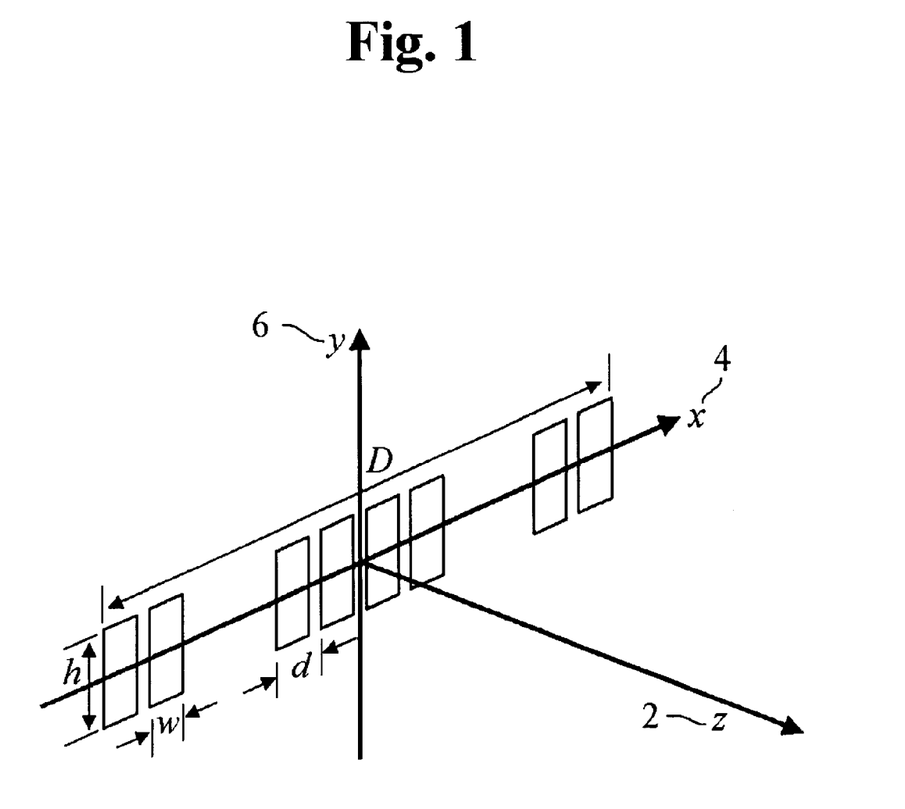
FIG. 1 shows the coordinate system of the transducer.

An ultrasound imaging system for medical use provides real-time two-dimensional (2-D) images by using transducers that transmit ultrasound signals into the human body and applying various signal processes on the reflected signals. As shown in FIG. 1, the resolution of the ultrasound image is determined by resolutions in: axial direction 2, the direction of the transmitted beam orthogonal to the width of the transducer; lateral direction 4, the direction orthogonal to axial direction 2 and in the plane of the width of the transducer; and elevational direction 6, the direction orthogonal to axial direction 2 and the width of the transducer. The axial resolution is not a critical factor in determination of the entire resolution of an ultrasound image since the axial resolution is generally three to five times higher than the other resolution components. However, unlike the axial resolution, the lateral and elevational resolutions vary depending on the transmit/receive focusing technique.

Figure 2:
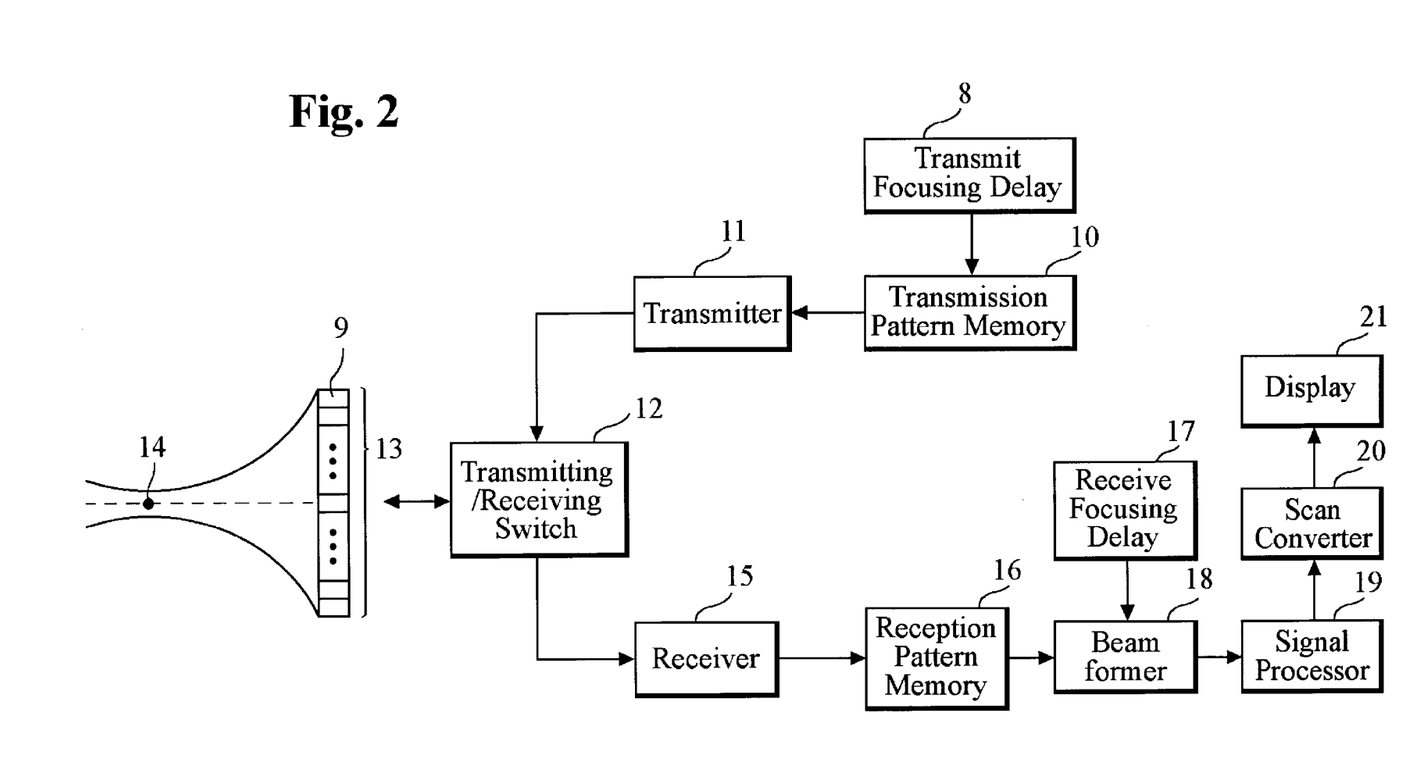
FIG. 2 illustrates receive dynamic focusing in an ultrasound imaging system.

It is known that the lateral resolution can be improved by performing real-time receive dynamic focusing on all imaging points. Details of the real-time receive dynamic focusing will now be illustrated with reference FIG. 2. Referring to FIG. 2, transmission signals (not shown) of the ultrasound imaging system are delayed by the delay time corresponding to the focusing depth of each transducer 9 of transducer array 13 by transmit focusing delay 8. The transmission signals with the time delay are stored in transmission pattern memory 10 and transmit-focused to the target object(not shown) by transducer array 13 through transmitter 11 and transmitting/receiving switch 12. All transmitted beams are focused to fixed transmit focal point 14. After that, echo signals are reflected from focal point 14 and converted to electronic signals through each transducer 9 of transducer array 13. They are stored in reception pattern memory 16 through transmitting/receiving switch 12 and receiver 15. The echo signals stored in reception pattern memory 16 have different phases which vary in accordance with the different focusing depths of each transducer 9. Thus, a variable time delay is added through receive focusing delay 17 so that the echo signals are in phase. The in-phase echo signals are combined at beamformer 18 and processed at signal processor 19, and displayed on display 21 through scan converter 20.

While only one fixed transmit focal point 14 has been discussed, receive dynamic focusing is also possible with respect to all imaging points constituting one transmit scan line from echo signals obtained by a single transmission. Receive dynamic focusing is performed by compensating for the differences in distance between the transducers and the focal point.

However, the two-way dynamic focusing is performed only at the focal point 14 because the transmit focusing illustrated in FIG. 2 is performed at the focal point 14. As a result, the lateral resolution may be degraded as the beams rapidly spread if they pass through the focal point 14.

Figure 3:
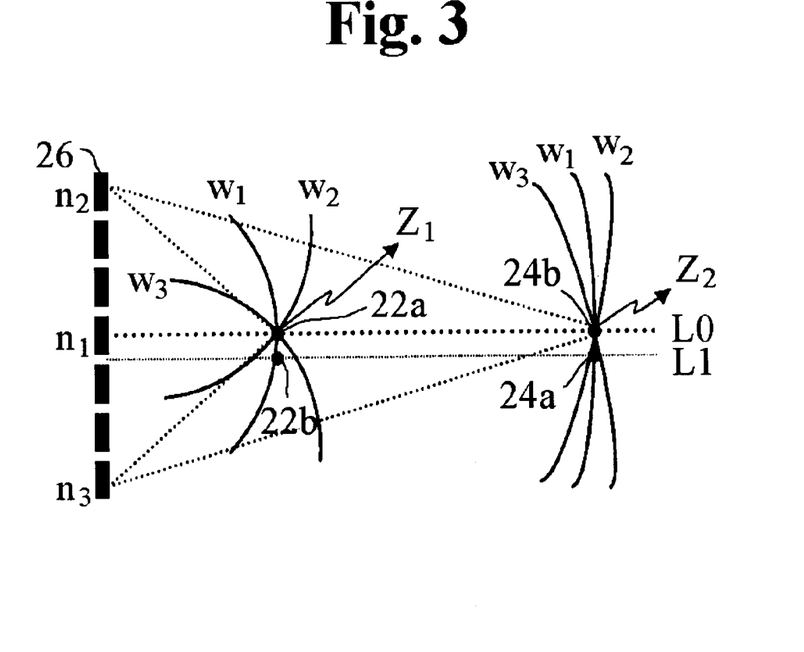
FIG. 3 illustrates beam spreading of spherical waves.

Referring to FIG. 3, the lateral resolution is degraded, depending on the focusing depth. When the delay time for the receive focusing is compensated, echo signals received by respective transducers, $n_1$, $n_2$, and $n_3$, are the combination of signals reflected from reflectors $22a$ and $22b$ on curved surfaces $W_1$, $W_2$, and $W_3$. Curves $W_1$, $W_2$, and $W_3$ lie on circles centered on transducers $n_1$, $n_2$, and $n_3$ with radii equal to the distance between each transducer and focusing depth $Z_1$, respectively. If two reflectors $22a$ and $22b$ exist on $Z_1$ and echo signals reflected from the two reflectors are combined, then only the power of echo signals reflected from reflector $22a$ on line L0 is strengthened. However, if echo signals reflected from two reflectors $24a$ and $24b$ on $Z_2$ are combined, then the powers of echo signals reflected from reflector $24a$ on line L1 and reflector $24b$ on line L0 are simultaneously strengthened. Difference in the lateral resolution based on focusing depth arises because whereas the three curves at $Z_1$ only overlap with respect to reflector $22a$ on line L0, the curves at $Z_2$ overlap with respect to reflector $24a$ on line L1 and reflector $24b$ on line L0, lowering the lateral resolution.

SUMMARY OF THE INVENTION

It is, therefore, the objective of the present invention to provide a synthetic aperture focusing method which is capable of two-way dynamic focusing through the use of planar waves, thereby improving the lateral resolution.

In accordance with a preferred embodiment of the present invention, there is provided to a synthetic aperture focusing method for an ultrasound imaging system comprising the steps of: producing planar waves by a plurality of transducers; transmitting the planar waves to a target object; receiving signals reflected from the target object through a plurality of receive subapertures, wherein each receive subaperture is comprised of at least one of the plurality of transducers; dynamic-focusing the received signals; and combining the dynamic-focused signals to form at least one beam pattern.

BRIEF DESCRIPTION OF DRAWINGS

The above and other objects and features of the present invention will become apparent from the following description of the preferred embodiments given in conjunction with the accompanying drawings.

DETAILED DESCRIPTION OF THE PRESENT INVENTION

Preferred embodiments of the present invention will now be described with reference to FIGS. 4 to 14.

Figure 4:
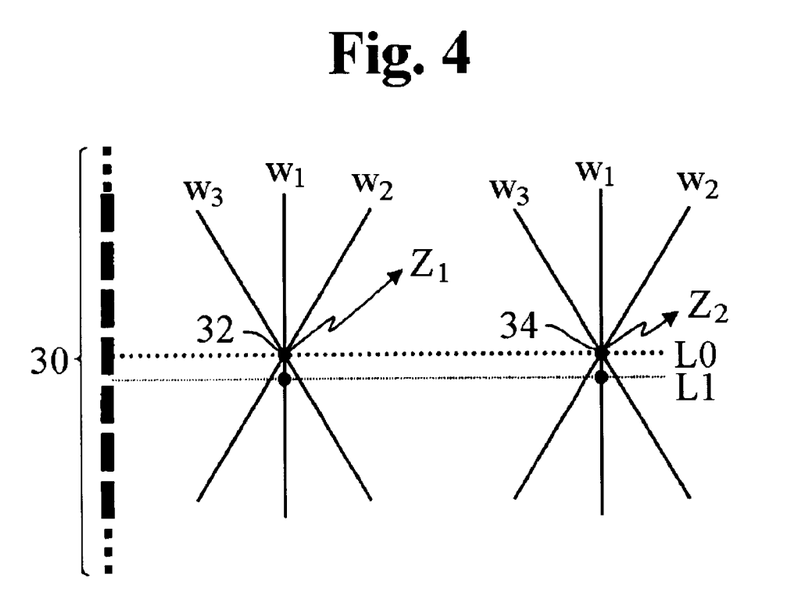
FIG. 4 illustrates a scheme for improved lateral resolution by using planar waves in accordance with the present invention.

Referring to FIG. 4, the lateral resolution, which is degraded as imaging depth increases, can be improved by using planar waves. Hereinafter, imaging depth means focusing depth as previously described. If planar waves are transmitted at different angles from very large transmit aperture 30, having a plurality of array elements, so that the transmitted beams overlap at all imaging points, then the identical phase with respect to each planar wave is expressed as $W_1$, $W_2$ and $W_3$. As in the case for spherical waves, as illustrated in FIG. 3, planar waves overlap at $Z_1$ with respect to reflector 32 on line L0, and thus the power of the echo signals is increased. Furthermore, since the shape of the overlapping of the planar waves does not vary with the imaging depth, the planar waves overlap only at $Z_2$ with respect to reflector 34 on line L0. Thus lateral resolution may be improved despite the limitations caused by increasing imaging depth.

Figure 5:
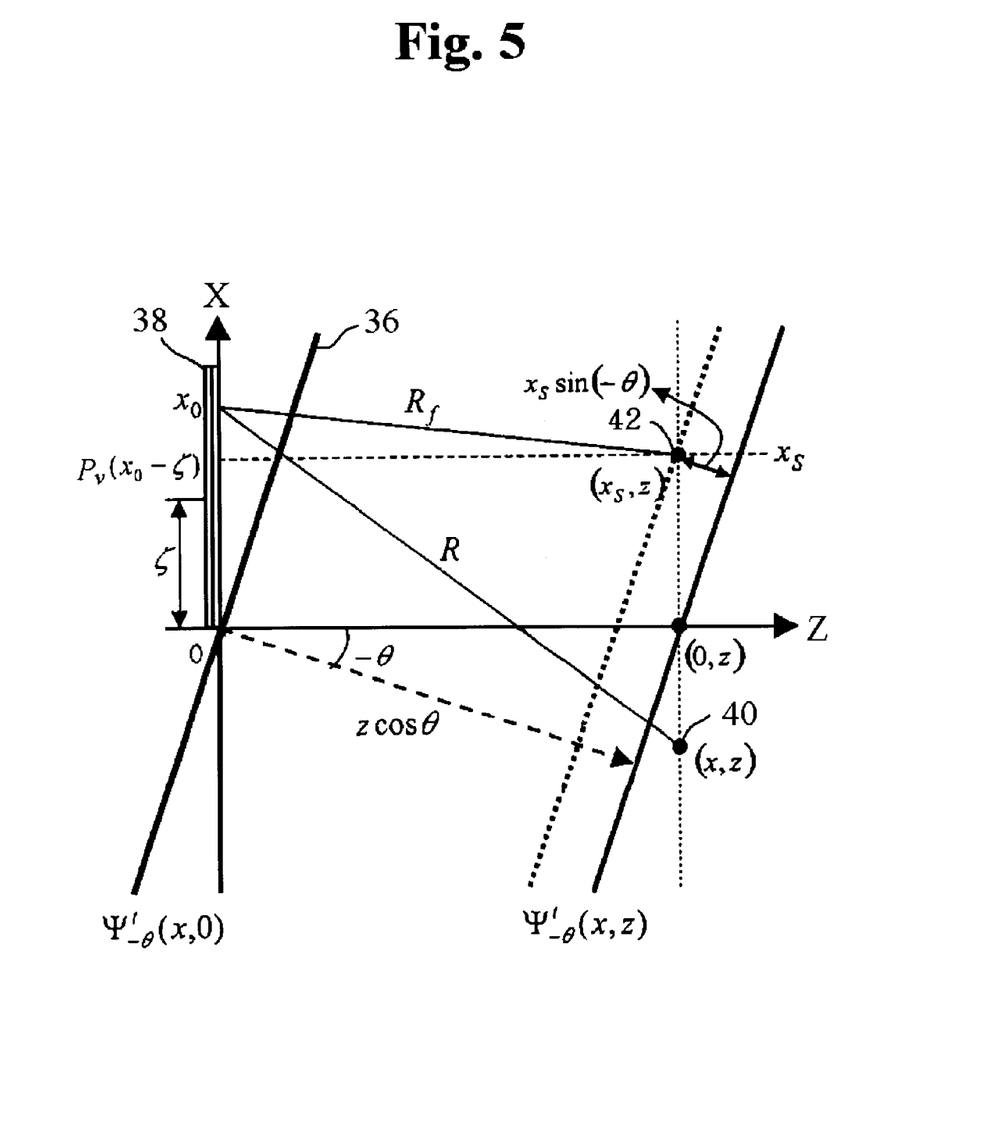
FIG. 5 illustrates the transmission/reception model in synthetic aperture focusing in accordance with the present invention.

FIG. 5 illustrates a transmission/reception model for synthetic aperture focusing to obtain a beam pattern from echo signals obtained by transmitting planar waves 36. Referring to FIG. 5, planar waves 36 are transmitted at angle $-\theta$ with respect to the Z-axis and echo signals are received by receive subaperture 38, which has a finite size centered at $\chi=\zeta$. R is the distance from one point on receive subaperture 38 to arbitrary observation point 40 (x, z). $R_f$ is the distance from one point on receive subaperture 38 to imaging point 42 ($x_s$, z). An angle of wave propagation $\theta$ of planar waves 36 varies with center position $\zeta$ of receive subaperture 38 as:

$$\theta = \frac{\zeta}{\eta} \quad \text{Eq. 1}$$

wherein $\eta$ is an arbitrary constant, which determines the variation of the angle of wave propagation and the maximum angle of wave propagation ($\theta_{max}=\zeta_{max}/\eta$). If $\theta_{max}<<1$, Equation 1 can be approximated as:

$$\sin(-\theta) = \sin\left(-\frac{\zeta}{\eta}\right) \approx -\frac{\zeta}{\eta} \quad \text{Eq. 2}$$

In the synthetic aperture focusing technique using planar waves, planar waves are transmitted at different angles of wave propagation. Echo signals reflected from a target object are received by the receive subapertures at the respective positions corresponding to the different angles of wave propagation and stored in receive pattern memory 16. The echo signals received by the receive subapertures and stored in receive pattern memory 16 are dynamic-focused, thereby forming beams. Beam patterns focused by the above beam forming process can be represented, with the application of Equation 2, as:

$$\Psi(x, z) = c_0 P_r\left(\frac{x-x_s}{\lambda z}\right) \int_{-\infty}^{\infty} p_s(\zeta-\gamma)t(\zeta)e^{-jk\frac{(x-x_s)}{z}\zeta} e^{-jk\frac{x}{\eta}\zeta} e^{jk\sqrt{1-(\zeta/\eta)^2}z} d\zeta \quad \text{Eq. 3}$$

wherein, $p_s(\zeta)$ is a synthetic window function showing the range of the receive subaperture used for compounding one scan line, $t(\zeta)$ is a synthetic transmit delay used when the signals of the receive subapertures are combined, and $\gamma$ is the center position of the synthetic window function. Synthetic transmit delay and beam patterns focused by the above beam forming process are represented by Equation 4 and Equation 5, respectively:

$$t(\zeta) = e^{jk\frac{x_s}{\eta}\zeta} e^{-jk\sqrt{1-(\zeta/\eta)^2}z} \quad \text{Eq. 4}$$

$$\Psi(x, z) = c_0 P_r\left(\frac{x-x_s}{\lambda z}\right) \int_{-\infty}^{\infty} p_s(\zeta-\gamma)e^{-jk(\frac{1}{z}\frac{1}{\eta})(x-x_s)\zeta} d\zeta \quad \text{Eq. 5}$$

$$= c_0 e^{-jk\left(\frac{x-x_s}{z_{eq}}\right)\gamma} P_r\left(\frac{x-x_s}{\lambda z}\right) P_s\left(\frac{x-x_s}{\lambda z_{eq}}\right)$$

Since Equation 5, which is satisfied with respect to all imaging points, is expressed as the product of a Fourier transform of a receive subaperture function $p_r(x_0)$ and a Fourier transform of a synthetic window function $p_s(\zeta)$, two-way dynamic focusing is possible. However, in order to obtain the above results, $\eta$ should be selected to satisfy $\theta_{max}=\zeta_{max}/\eta \leq 0.4$ (rad.).

An equivalent distance $z_{eq}$ is defined as a function of z and $\eta$:

$$z_{eq} = \frac{1}{\frac{1}{z}+\frac{1}{\eta}} = z // \eta \quad \text{Eq. 6}$$

where $Z_{eq}$ always takes the lesser value between z and $\eta$. If $z=\eta$, then $$z_{eq} = \frac{z}{2} = \frac{\eta}{2}.$$

If $z>>\eta$, then $Z_{eq}\approx\eta$. These characteristics of the equivalent distance $Z_{eq}$ indicate that the mainlobe width of the lateral beam pattern is narrower, at all imaging points, than that of the lateral beam pattern in a conventional focusing technique.

Figure 6:
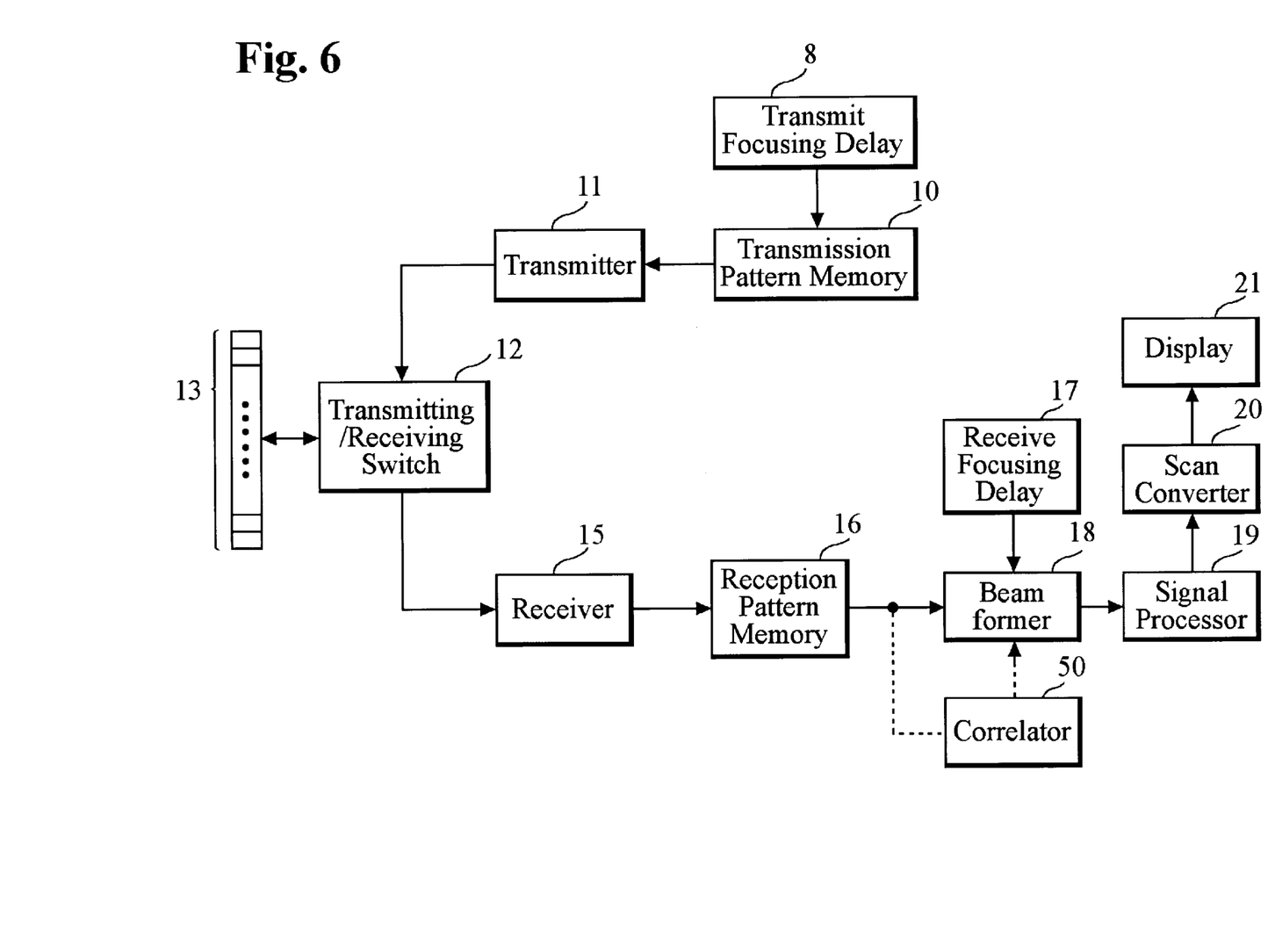
FIG. 6 illustrates code transmission scheme in an ultrasound imaging system.

Referring to FIG. 6, although the synthetic aperture focusing has been described under a pulse transmission scheme, it may also be performed under a code transmission scheme if correlator 50 is further used to compress the received signals.

Conventionally, an ultrasound imaging system forms images by using short transmit signals. Since the power of the received signals is reduced by attenuation in the medium, forming an image with signals received from a distant reflector is very difficult given the limited signal to noise ratio (SNR). The synthetic aperture focusing technique, in accordance with the present invention, is directed to improving the lateral resolution by reducing beam spreading at deeper imaging depths. Thus, a sufficient SNR should be obtained at deeper imaging depths. For the same reasons as discussed above, in the case of a code transmission scheme having a long cycle code, such as a weighted chirp code or Golay code, the advantages of the synthetic aperture focusing of the present invention are maximized by transmitting planar waves with deflection time delays and compressing the received signals at correlator 50.

Furthermore, all synthetic aperture focusing techniques are subject to the problem of fast moving reflectors. One solution to this problem is raising the frame rates of images. The synthetic aperture focusing technique, in accordance with the present invention, can raise the frame rates with an orthogonal code having great auto-correlation and less cross-correlation. Planar waves by using a kind of orthogonal codes are simultaneously transmitted with different angles. The orthogonal codes of the received signals are extracted and compressed by correlator 50, and beam patterns are formed. In this case, the frame rates are increased by as much as the number of orthogonal codes that are simultaneously transmitted. For example, orthogonal codes such as Golay codes or weighted chirp signals are transmitted as the planar waves. For weighted chirp signals, if a transmitted weighted chirp signal has an ascending frequency in one frequency zone, in order to reduce the cross-correlation, the other weighted chirp signal should have a descending frequency in an adjacent frequency zone.

Although synthetic aperture focusing, in accordance with the present invention, can be accomplished with a linear array probe or a phased array probe, for the sake of brevity, synthetic aperture focusing will be described only with reference to a linear array probe.

Planar waves can be transmitted from all array elements with deflection time delays. Echo signals received by moving the receive subaperture are stored in receive pattern memory 16. However, the maximum imaging depth decreases as the size D (=$D_t$) of the transmit aperture decreases.

Figure 7:
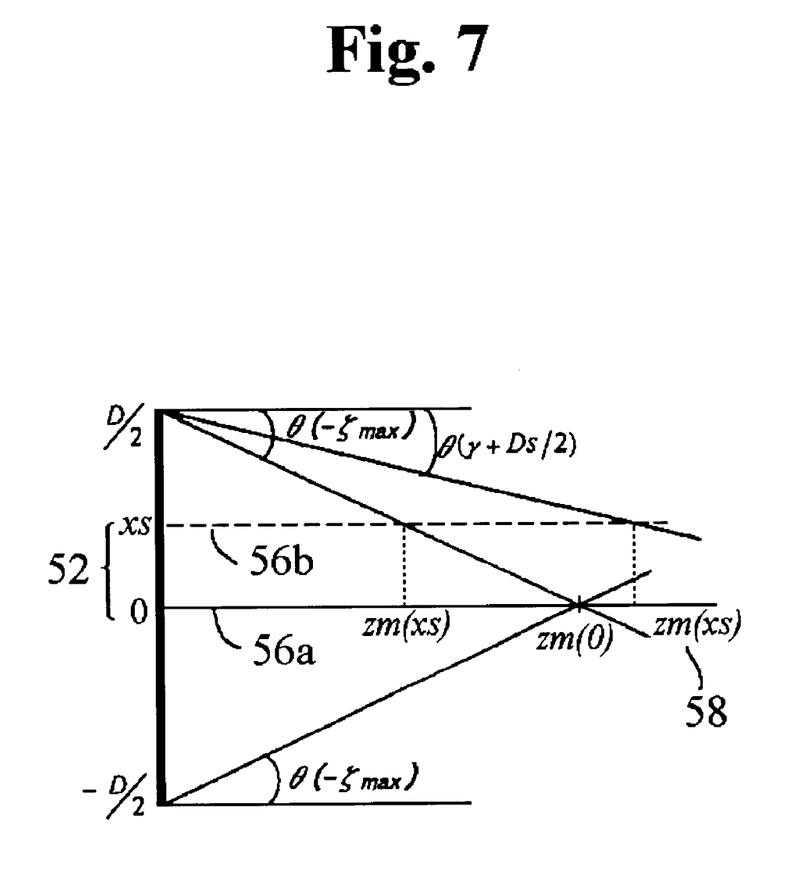
FIG. 7 illustrates imaging depth of each transmit scan line in the ultrasound imaging system in accordance with the present invention.

FIG. 7 illustrates how to determine the maximum imaging depth of two transmit scan lines 56$a$ and 56$b$ positioned at x=$x_s$=0 and x=$x_s$>0, respectively. When the maximum angle of wave propagation of the transmit planar waves is $\zeta_{max}/\eta$, $z_m(0)$ and $z_m(x_s)$ are the maximum imaging depths of the two transmit scan line. The maximum imaging depth of each transmit scan line can be expressed as follows:

$$z_m(x_s) = \frac{D_t/2 - x_s}{\tan(\theta_{max})} \approx \eta \frac{D_t/2 - x_s}{\zeta_{max}} \qquad \text{Eq. 7}$$

Equation 7 may be rewritten in terms of $D_s$, the width of the synthetic window function, and $\gamma$. The positive maximum angle of wave propagation of transmitted planar waves may be expressed as $(\gamma+D_s/2)/\eta$ rather than $\theta_{max}$. Thus, the actual imaging depth $z_a(x_s)$ with respect to an arbitrary transmit scan line can be expressed as follows:

$$z_a(x_s) = \frac{D_t/2 - x_s}{\tan[(\gamma + D_s/2)/\eta]} \approx \eta \frac{D_t/2 - x_s}{\gamma + D_s/2} \qquad \text{Eq. 8}$$

Furthermore, actual imaging depth 58 with respect to an arbitrary transmit scan line as expressed in Equation 8 can be defined as the starting point of a rear spreading region (hereinafter referred to as "RSR") of a finite transmit aperture. With a finite transmit aperture, the imaging depth of planar waves is limited. The beam patterns as defined in Equation 5 are not obtained beyond the RSR and the mainlobe width is increased beyond the RSR. According to Equation 8, however, actual imaging depth 58 $z_a(x_s)$ varies with the position $x_s$ of each transmit scan line and increases in proportion to the size $D_t$ of the transmit aperture and $\eta$. In particular, $z_a(x_s)$ is greatly increased by approximating $\gamma$ as $-D_s/2$ as shown in FIG. 7. If the transmit scan line is positioned on the positive side of the x axis, then the planar waves transmitted at a positive angle of wave propagation do not contribute to the imaging points beyond $z_m(x_s)$, while the planar waves transmitted at a negative angle of wave propagation contribute to the imaging points beyond $z_m(x_s)$. That is, the maximum imaging depth is increased by combining only signals of planar waves that contribute to given imaging points. Since the lateral resolution is determined only by $\eta$ and $D_s$, the desired lateral resolution and actual imaging depth are obtained by appropriately selecting $\gamma$, $\eta$ and $D_s$.

A computer simulation using a 3.5 MHz linear array probe is implemented in the preferred embodiment of the present invention. Unless specified otherwise, the width of the synthetic window function $D_s$ and the size of the receive subaperture are 64 d, and the size of the transmit aperture is 128 d.

Figure 8:
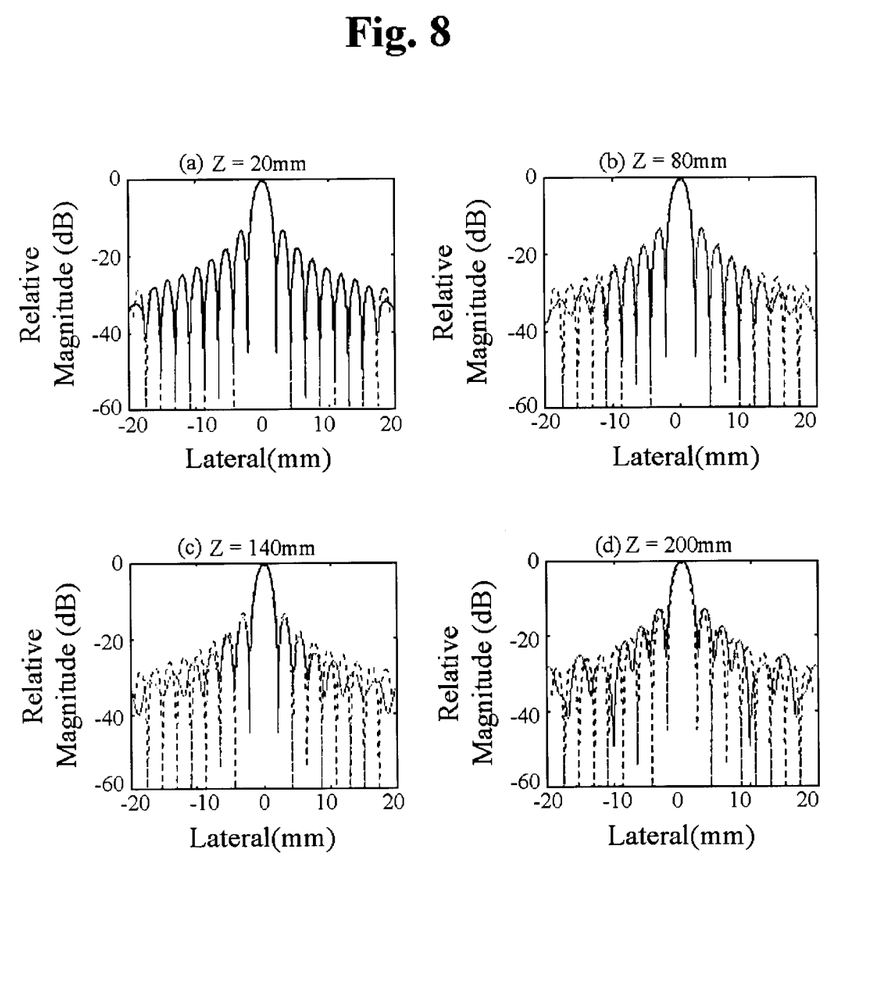
FIG. 8 shows transmission beam patterns of an infinite transmit aperture and a finite transmit aperture.

FIG. 8 shows variations of transmit beam patterns of the planar waves transmitted from an infinite transmit aperture (dotted line) with respect to a finite transmit aperture (solid line), where the maximum angle of wave propagation $\theta_{max}$ is 0.2 radians ($\zeta_{max}$=192 mm, $\eta$=96 mm). The transmit beam pattern at a shallow depth is almost the same for a finite and infinite transmit aperture. As the depth increases, the sidelobe widths change. At 200 mm, there is a minute difference in the mainlobe width. Beyond this point, thus, the mainlobe width of the transmit beam pattern may be increased. This result shows approximation of the synthetic aperture focusing technique using the planar waves from the finite transmit aperture.

Figure 9:
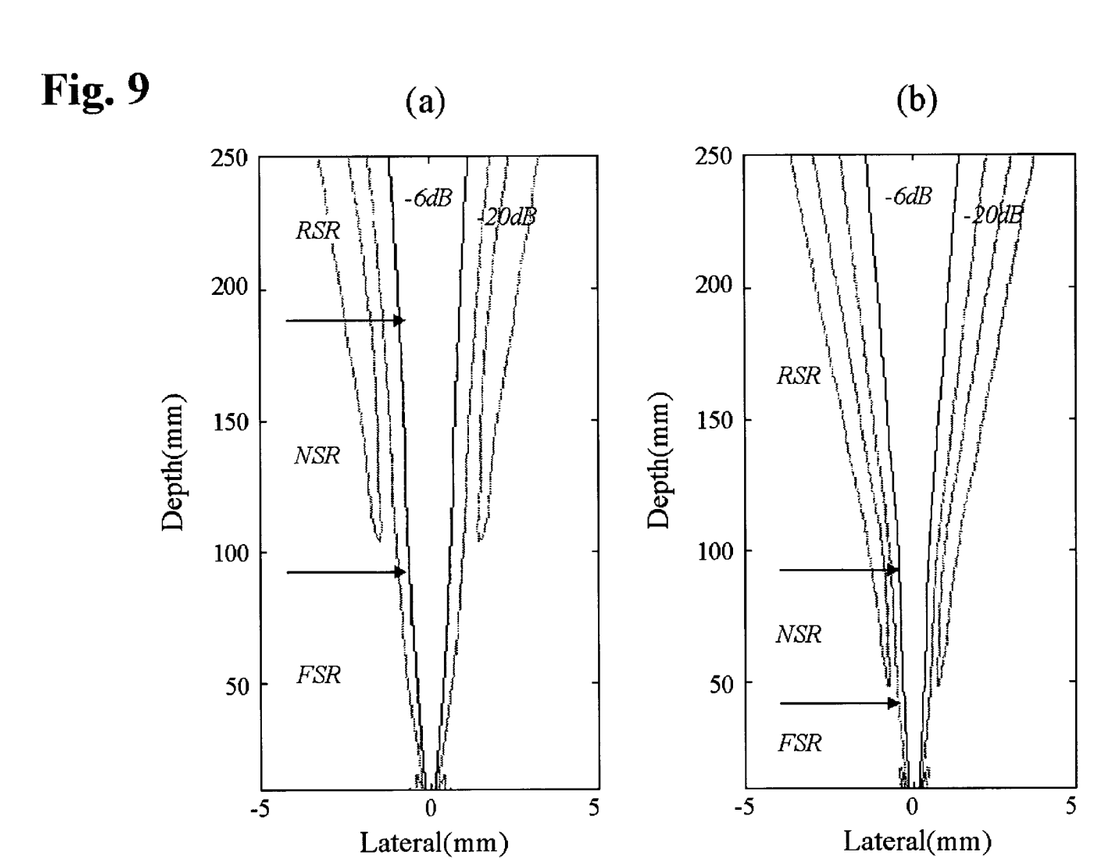
FIG. 9 shows the diffusion area of synthetic aperture focusing in accordance with the present invention.

FIG. 9 illustrates how the value $\eta$ affects the beam pattern for a finite transmit aperture, where $\gamma$=$x_s$=0. FIGS. 9($a$) and ($b$) show the contour lines of the sound field, where $\eta$=96 mm and $\eta$=48 mm, respectively. Referring to FIG. 9($a$), a front spreading region ("FSR") extends to 96 mm, identical to the value $\eta$. Referring to FIG. 9($b$), the FSR extends to 48 mm, also identical to the value $\eta$. Referring to FIG. 9($a$), beam widths of −6 dB at 48 mm and 96 mm are 0.74 mm and 1.22 mm, respectively. Referring to FIG. 9($b$), beam widths of −6 dB at 48 mm and 96 mm are 0.62 mm and 0.89 mm, respectively. This shows that the beam width decreases as $\eta$ decreases. Thus, the value of $\eta$ is a critical factor in determining the beam width and FSR for a finite transmit aperture. Also, the lateral beam width in the FSR increases linearly. An approximately uniform lateral beam width is maintained in a non-spreading region.

The RSR, as defined in Equation 8, is also determined by $\eta$. The RSR starts at z=$z_a(0)$=2$\eta$, where $\gamma$=$x_s$=0. Referring to FIG. 9($a$) and FIG. 9($b$), the RSR starts at 192 mm and 96 m, respectively. The starting values of the RSR are increased two times compared to the maximum imaging depth $Z_m(0)$ due to the maximum angle of wave propagation computed by Equation 7. As described above, the actual imaging depth can be increased by controlling not only the width $D_s$ of the synthetic window function but its center position $\gamma$.

Figure 10:
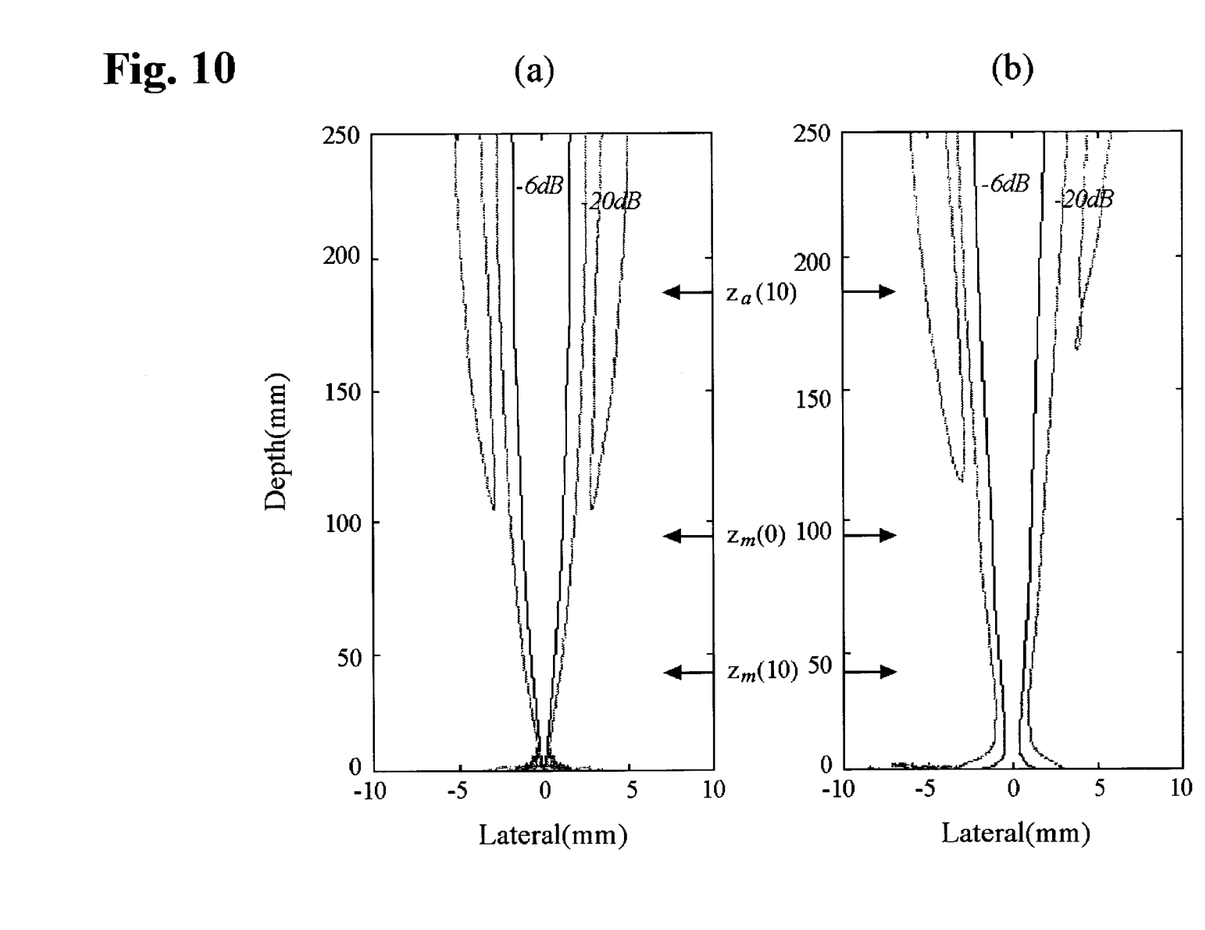
FIG. 10 shows contour lines of the transmit/receive sound field in accordance with synthetic aperture focusing, where $\gamma=0$ and a finite transmit aperture is used.
Figure 11:
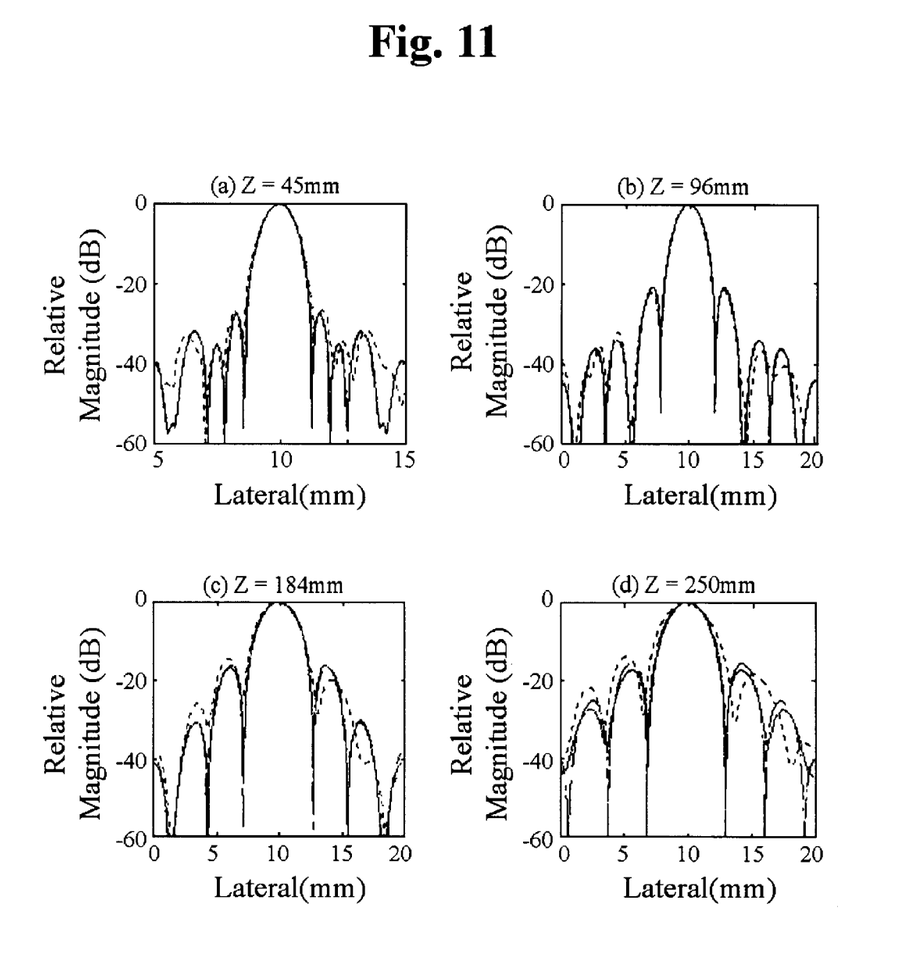
FIG. 11 shows various lateral beam patterns in synthetic aperture focusing in accordance with the present invention.

FIGS. 10 and 11 illustrate computer simulation results showing the influence of the width $D_s$ of the synthetic window function on the imaging depth. For the case where $D_s$=32 d and $\gamma$=0, FIG. 10($a$) shows the contour lines of the transmit/receive sound field of a transmit scan line positioned at x=$x_s$=0 mm and FIG. 10($b$) shows the contour lines of the transmit/receive sound field of a transmit scan line positioned at x=$x_s$=10 mm. If the other experimental parameters are kept the same but the width of the synthetic window function is changed to $D_s=64$ d, then the actual imaging depths of the two transmit scan lines become $z_a(0)=192$ mm, $z_a(10)=92$ mm, according to Equation 8. Since $z_a(0)$ (not shown) and $z_a(10)$ are 384 mm and 184 mm, respectively, for $D_s=32$ d, they are increased two times in the case of $D_s=64$ d. Also, if $D_s=64$ d, then the −6 dB beam width of $z=z_m(0)=96$ mm is 1.2 mm. Since the beam width is 2.364 mm for $D_s=32$ d, the beam width is increased approximately two times when $D_s$ is decreased by one half. Thus, the beam width is inversely proportional and the actual imaging depth $z_a(x_a)$ is directly proportional to the width $D_s$ of the synthetic window function.

FIG. 11 illustrates beam patterns at various depths where $D_s=32$ d and $\gamma=0$. The solid line means a finite transmit aperture of $x=x_s=0$; dotted line means a finite transmit aperture of $x=x_s=10$ mm; and dash dotted line means an infinite transmit aperture of $x=x_s=0$. Where $x=x_s=0$, the mainlobe width of the lateral beam pattern of the finite transmit aperture is identical to that of an infinite transmit aperture at $z=250$ mm. Where $x=x_s=10$ mm, the mainlobe width of lateral beam pattern of the finite transmit aperture is identical to that of the infinite transmit aperture at $z=184$ mm. However, the mainlobe of lateral beam pattern of the finite transmit aperture is more spread out than that of the infinite transmit aperture at $z=250$ mm.

Figure 12:
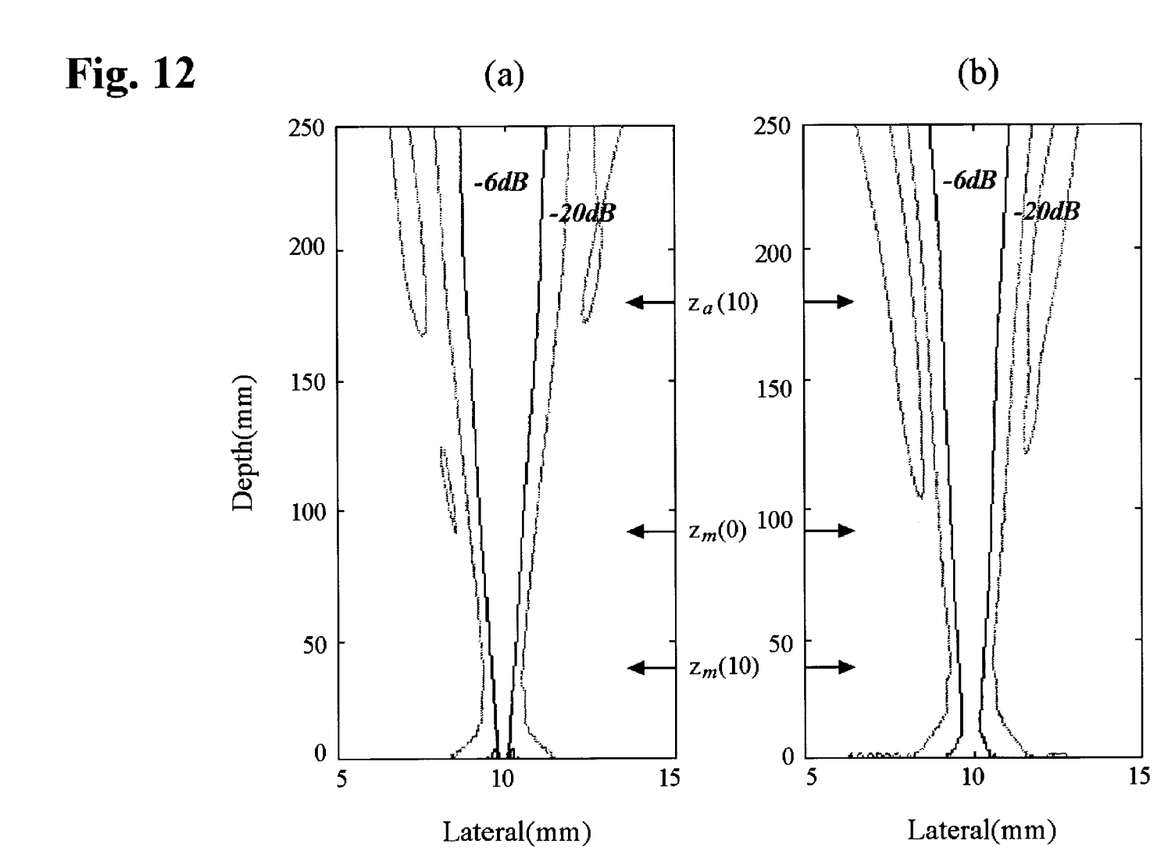
FIG. 12 shows contour lines of the transmit/receive sound field in accordance with synthetic aperture focusing, where the transmit scan line $x_s=10$ mm and a finite transmit aperture is used.
Figure 13:
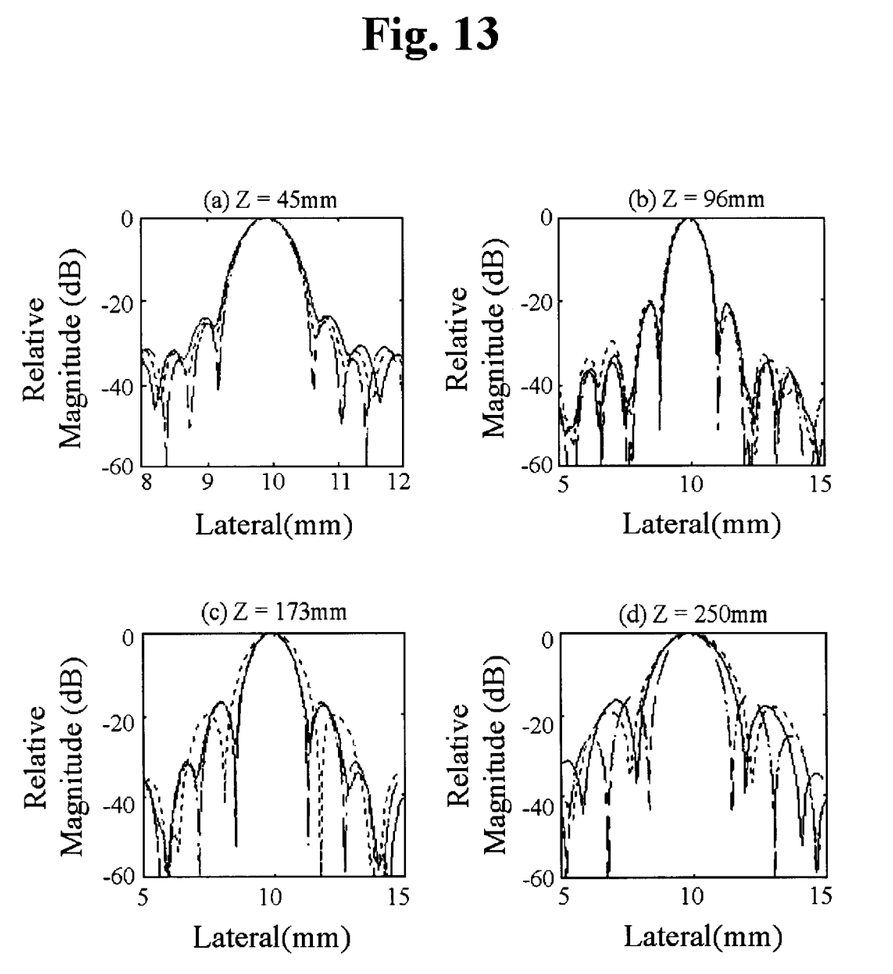
FIG. 13 shows various lateral beam patterns in synthetic aperture focusing in accordance with the present invention.

FIGS. 12 and 13 illustrate the influence of $\gamma$, the center position of the synthetic window function, on the imaging depth. FIGS. 12(a) and (b) illustrate the contour lines of the transmit/receive sound field where $\gamma=0$ and $\gamma=-15$ d, respectively, for $D_s=64$ d and $x_s=10$ mm. FIG. 13 illustrates a lateral beam pattern (dash dotted line) of an infinite transmit aperture where the transmit scan line is positioned at $x=x_s=0$ and a lateral beam pattern of a finite transmit aperture where transmit scan line is positioned at $x=x_s=10$ mm, for $\gamma=0$ (dotted line) and $\gamma=-15$ d (solid line), at various depths.

As shown in FIGS. 12(a) and 13, when $\gamma=0$, the mainlobe width is increased beyond $z=z_m(0)=96$ mm. On the other hand, as shown in FIGS. 12(b) and 13, when $\gamma=-15$ d, the mainlobe width is the same as that of the infinite transmit aperture until $z=z_a(10)=173$ mm. Furthermore, the −6 dB beam width at depths of 180 mm, 190 mm, and 200 mm are 1.705 mm, 1.7801 mm, 1.861 mm, respectively, and for an infinite transmit aperture, 1.634 mm, 1.669 mm, 1.702 mm, respectively. The computer simulation results of FIGS. 12 and 13 verify that the effective imaging depth can be increased by appropriately selecting $\gamma$.

FIG. 14 shows improvements to the lateral resolution according to the synthetic aperture focusing technique compared to a conventional focusing technique.

A 3.5 MHz linear array probe with 192 array elements having a width of 0.3 mm transmits 3 MHz short pulses. The size of the transmit/receive aperture and the synthetic window function is 64 d. The receive dynamic focusing is performed at 60 mm with a fixed transmit focusing manner. The maximum angle of wave propagation is 0.35 radians. There are 13 reflectors in total: a top reflector positioned at $x=0$, $z=60$ mm; a bottom reflector positioned at $x=0$, $z=195$ mm; and an outermost reflector positioned at $x=15$ mm, $z=139$ mm.

Figure 14A:
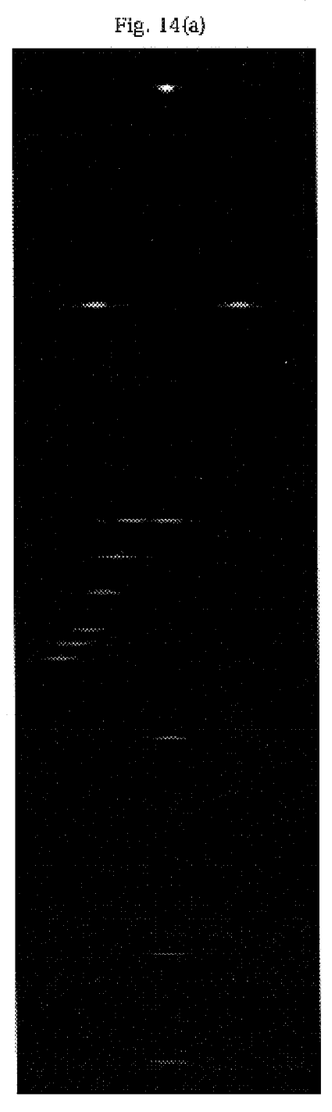
FIG. 14 shows computer simulation results of lateral resolution from receive dynamic focusing and synthetic aperture focusing.
Figure 14B:
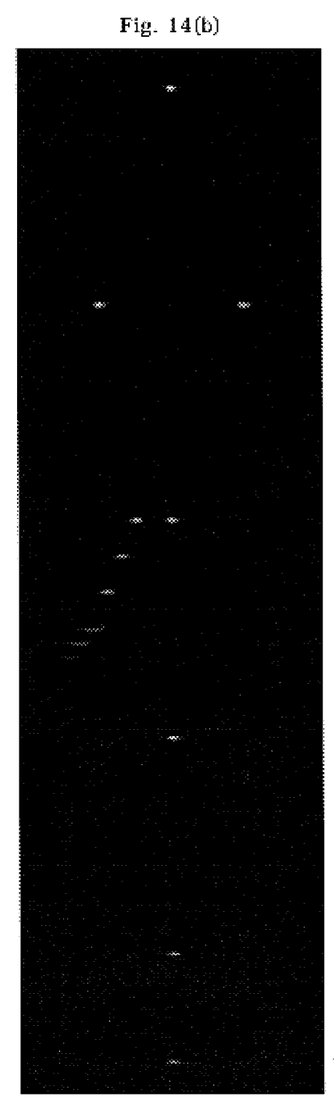

FIG. 14(a) is a computer simulation result showing the lateral resolution formed from receive dynamic focusing. FIG. 14(b) is a computer simulation result showing the lateral resolution formed from synthetic aperture focusing in accordance with the present invention. These computer simulation results show that the resolution from synthetic aperture focusing in accordance with the present invention is excellent for all imaging points.

The synthetic aperture focusing technique, according to the present invention, provides two-way dynamic focusing and excellent lateral resolution. It can be performed not only under a pulse transmission scheme but also a code transmission scheme. The effective imaging depth is increased by selecting the synthetic window function and its center position. Additionally, the technique is very useful for improving the lateral resolution of images obtained by conventional focusing techniques.

While the present invention has been shown and described with respect to the particular embodiments, it will be apparent to those skilled in the art that many exchanges and modifications may be made without departing from the spirit and scope of the invention as defined in the appended claims.

What is claimed is:

1. A synthetic aperture focusing method for an ultrasound imaging system, comprising the steps of:
   producing planar waves by a plurality of transducers;
   transmitting the planar waves to a target object;
   receiving signals reflected from the target object through a plurality of receive subapertures, wherein each receive subaperture is comprised of at least one of the plurality of transducers;
   storing the received signals in a receive pattern memory;
   compressing the stored signals by using a correlator;
   dynamic-focusing the received signals; and
   combining the dynamic-focused signals to form at least one beam pattern.

2. The synthetic aperture focusing method of claim 1, wherein the transmitting step further comprises transmitting each of the planar waves to the target object at a corresponding angle of wave propagation which is determined based on a center position of each of the plurality of receive subapertures.

3. The synthetic aperture focusing method of claim 1, wherein the producing step further comprises producing the planar waves by the plurality of transducers with different deflection time delays.

4. The synthetic aperture focusing method of claim 1, wherein the producing step further comprises producing the planar waves by the plurality of transducers based on a pulse transmission method or a code transmission method.

5. The synthetic aperture focusing method of claim 4, wherein the planar waves are obtained by using orthogonal Golay codes or frequency-divided weighted chirp signals.

6. The synthetic aperture focusing method of claim 1, wherein the plurality of transducers are a linear array probe or a phased array probe.

* * * * *